US00RE34289E

United States Patent [19]

McClain et al.

[11] E Patent Number: Re. 34,289

[45] Reissued Date of Patent: Jun. 22, 1993

[54] PADDING MACHINES

[75] Inventors: Ray McClain, Tulsa; Robert Ross, Yale, both of Okla.; Donald R. Beach, Holly, Mich.

[73] Assignee: Ray McClain, Inc., Tulsa, Okla.

[21] Appl. No.: 549,165

[22] Filed: Aug. 13, 1990

Related U.S. Patent Documents

Reissue of:

[64] Patent No.: 4,664,791
Issued: May 12, 1987
Appl. No.: 827,247
Filed: Feb. 7, 1986

U.S. Applications:

[62] Division of Ser. No. 350,601, May 11, 1989, abandoned.

[51] Int. Cl.[5] ..... B07B 1/46

[52] U.S. Cl. ..... 209/421; 37/142.5; 209/260; 209/234; 209/240; 405/179

[58] Field of Search ..... 209/235, 244, 260, 309, 209/311, 315, 421, 910, 935, 420, 236, 240, 234; 405/179; 172/32; 37/142.5; 414/747; 296/2

[56] References Cited

U.S. PATENT DOCUMENTS

| | | | |
|---|---|---|---|
| 123,479 | 6/1872 | Hooton | 405/179 |
| 2,107,532 | 2/1938 | Hallenbeck | 209/260 |
| 2,857,691 | 10/1958 | Curran | 37/144 |
| 3,402,816 | 9/1968 | Taylor | 209/421 X |
| 3,431,741 | 3/1969 | Kinnan | 37/193 X |
| 3,439,806 | 4/1969 | Kass et al. | 209/260 |
| 3,596,384 | 8/1971 | Neujhar | 37/142.5 |
| 3,874,182 | 4/1975 | Potter et al. | 405/179 |
| 3,905,200 | 9/1975 | Ylinen | 37/193 X |
| 4,190,526 | 2/1980 | Bachland | 209/421 X |
| 4,301,910 | 1/1981 | Price | 37/142.5 X |
| 4,303,506 | 12/1981 | Finlay | 209/521 X |
| 4,362,435 | 12/1982 | Henry | 405/179 X |
| 4,591,432 | 5/1986 | Hartl | 209/421 |
| 4,664,791 | 5/1987 | McClain et al. | 209/421 |

FOREIGN PATENT DOCUMENTS

| | | | |
|---|---|---|---|
| 0071677 | 2/1983 | European Pat. Off. | 296/2 |
| 1345485 | 1/1963 | France | 209/421 |
| 1380398 | 1/1975 | United Kingdom | 37/142.5 |
| 1553667 | 10/1979 | United Kingdom | 209/421 |

*Primary Examiner*—Donald T. Hajec
*Attorney, Agent, or Firm*—Head & Johnson

[57] ABSTRACT

A padding machine is provided for angularly variable attachment to a mobile ground carrier having a hopper into which soil is placed, a vibratory feeder and screen receiving soil from the hopper, a chute receiving screened soil from the vibratory screen and feeder to deliver the same as padding on a pipeline within a ditch and a power source driving he vibratory feeder and screen.

21 Claims, 3 Drawing Sheets

PADDING MACHINES

Matter enclosed in heavy brackets [ ] appears in the original patent but forms no part of this reissue specification; matter printed in italics indicates the additions made by reissue.

*This is a divisional of copending reissue application Ser. No. 07/350,601 filed on May 11, 1989 now abandoned, which is a reissue application of U.S. Pat. No. 4,664,791.*

This invention relates to padding machines and particularly to machines for sifting soil to remove stones and debris and delivering clean sifted soil around a pipeline or cable.

In the laying of pipeline it has been common practice to have sifted dirt from a remote source of relatively stone and debris free dirt. This is, of course, expensive and time consuming. In order to overcome this problem it is desirable to be able to utilize the dirt removed from the ditch and add it back after the stones and dirt are removed. Several devices have been proposed in the past to accomplish this but with less than satisfactory results. One of the proposals is found in U.S. Pat. No. 2,857,691 to Curran. The device of that patent provides a boom carrying a table with an integral auger which is driven at one end by a motor mounted on the boom and at the other end connected to a rotating scoop which picks up dirt from one side of the ditch and dumps it onto spaced rings which act as a sieve and dump soil into the auger which carries it through the tube to a bottom slot which dumps it onto pipe in the ditch. This device is slow in operating, easily jammed and expensive to build and operate. Another proposal appears in U.S. Pat. No. 3,596,384 to Neujahr. This apparatus provides an auger which removes soil from the piled ridge of soil removed from the ditch to an auger which lifts soil up, dumped over a screen and into a high velocity set of impellers which throw the dirt onto the pipe line. Like Curran this device is slow in operating, expensive to build and operate. Price U.S. Pat. No. 4,301,910 provides a self-propelled back filling apparatus. This apparatus has a long boom with an earth receiving hopper and a conveyor belt for transporting earth from hopper to discharge. A hydraulic propulsion unit is provided at the front end to move the assembly along and over the digging equipment. This is an expensive device which does not sieve the dirt but simply transports it from a trench digger to a point rearwardly over the pipe laying equipment to dump the dirt back into the ditch on top of the pipe being laid.

The present invention provides a relatively simple and less expensive solution to this problem without any of the deficiencies of the prior art devices.

This invention provides a support carriage having attachment means at one end for attachment to a ground carrier such as a tractor, a power source on said carriage adjacent said attachment means, base means selectively pivoted at each end to permit said base means to be tilted at either end so as to keep the apparatus at an effective operating altitute when traversing inclines and declines, a chute means fixed to said base means, a vibratory feeder and screen fixed to said base means above the chute means, hopper support structure on said base means, feed hopper means are pivoted at either side on said hopper support structure above the vibrating screen and lift means acting on said hopper means to pivot said hopper means selectively at one said one pivoted side. The hopper means includes grizzly bars which serve as means to accumulate undesirable material. When the lift means pivots the hopper means, the undesirable material is discharged to the side of the padding machine. Preferably the support carriage has a three point hitch arrangement as an attachment means. The power source preferably includes a diesel generator and hydraulic pump. The lift means is preferably a pan of hydraulic cylinders on opposite ends of said hopper to tilt the same.

In the foregoing general description we have set out certain objects, purposes and advantages of this invention. Other objects, purposes and advantages of this invention will be apparent from the following description and the accompanying drawings in which.

Figure 1:
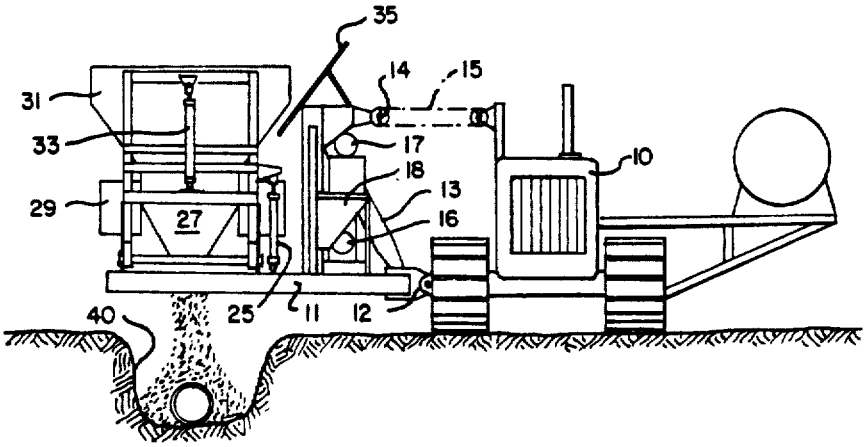
FIG. 1 is an front view of a tractor having the padding machine of this invention mounted thereon.
Figure 3:
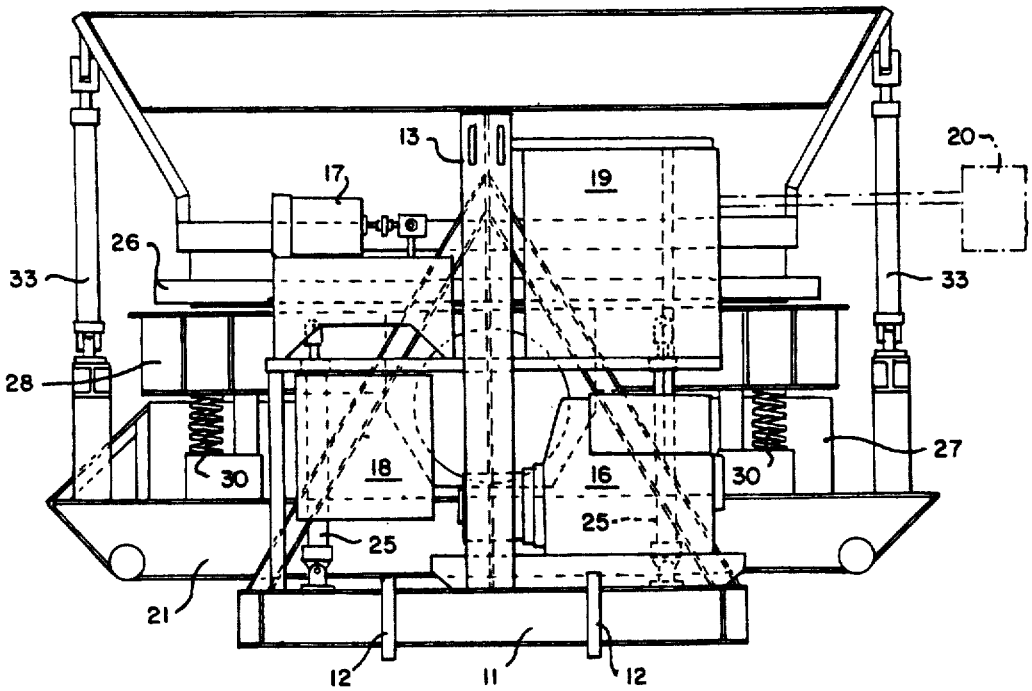
FIG. 3 is a side elevational view of the apparatus of this invention from the right of FIG. 2.
Figure 2:
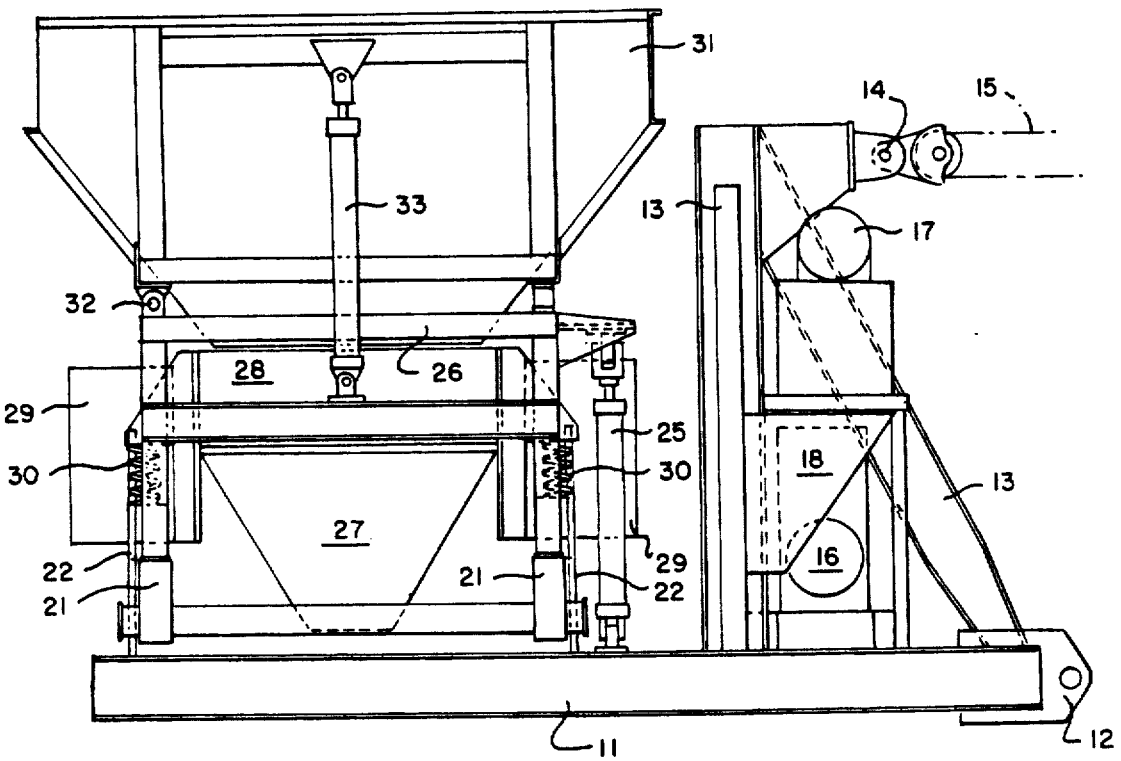
FIG. 2 is an end elevation of the apparatus of this invention.
Figure 4:
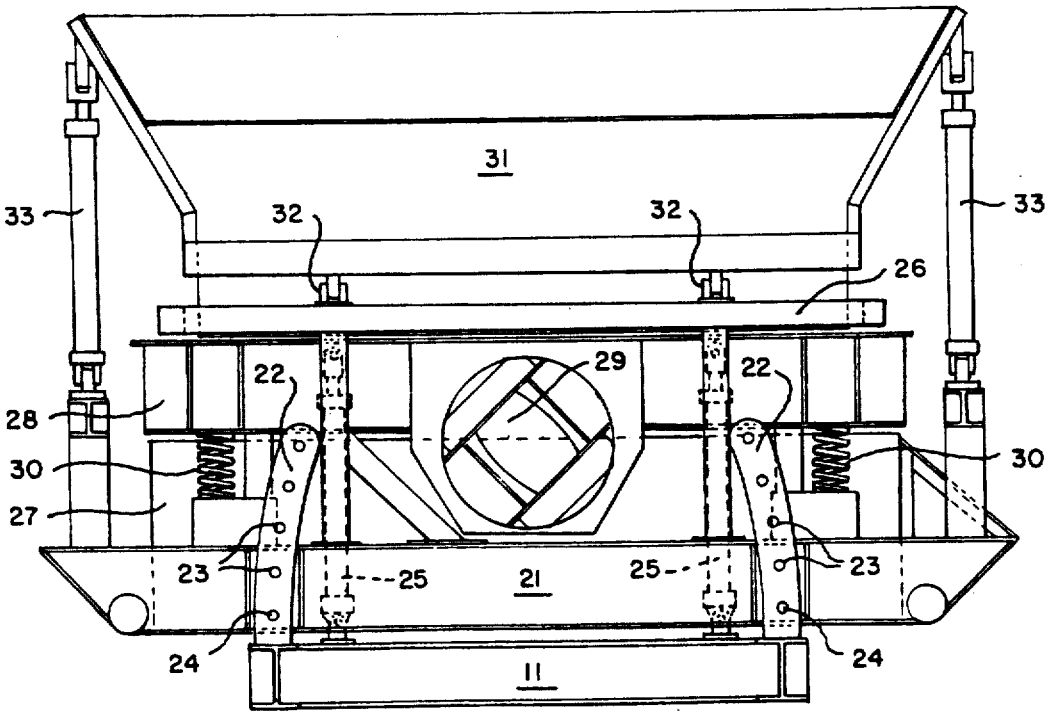
FIG. 4 is a side elevational view of the apparatus of this invention viewed from the left of FIG. 2.

Referring to the drawings, we have illustrated our invention mounted on a boom carrier crawler type tractor 10 of the form generally used in pipe laying operations. The apparatus of this invention includes a support carriage 11 having spaced tractor pin ears 12 at one end which are slidable together or apart to fit different tractor mountings. A vertical member 13 is fixed on said support carriage 11 adjacent the pivot eyes 12 and carries a third pivot eye member 14 at its end remote from carriage 11 to form a 3 point hitch arrangement. The support frame is pivoted by eyes 12 on the side of tractor 10. The third pivot eye 14 is attached to the tractor 10 by cable 15, which permits varying the angle at which support carriage 11 extends from tractor 10. A diesel generator 16 is mounted on support carriage 11 between vertical member 13 and pivot eyes 12 to supply electrical current for operating various elements of the invention. A hydraulic pump 17 is provided adjacent the diesel generator for supplying pressure fluid for operating hydraulic components of the invention. In the same area are provided a fuel tank 18, a control panel box 19 and a remote control box 20 to be mounted on tractor 10.

A base frame 21 is mounted on spaced uprights 22 extending above the support carriage 11. Each of the curved uprights 22 is provided with a plurality of spaced openings 23. The bottom openings 23 are adapted to receive a pivot pin 24 extending from base frame 21. The remaining openings 23 are adapted to receive a long pin extending across from one upright 22 to the opposite upright 22. The base frame 21 when raised at one end rests on this long pin. A pair of hydraulic cylinders and pistons 25 which engage a hopper support frame 26 attached to and spaced above base frame 21 are provided to selectively tilt the base frame 21 about pivot pins 24 at one end or the other to maintain the base frame level when the tractor is moving up or down hill. A chute 27 is fixed on the base frame 21 beneath a vibratory feeder and screen 28 which is driven by vibrator 29 and isolated on springs 30 mounted on base frame 21.

A hopper 31 is selectively mounted at either side on pivots 32 on hopper support frame 26. A pair of hydraulic cylinders and pistons 33 are mounted on base frame 21 for tilting hopper 31 on pivot 32, in the selected direction.

A rock deflector screen 35 is preferably mounted on vertical member 13 to protect the hydraulic pump, diesel generator and controls from rock mistakenly dumped beyond hopper 31.

Figure 5:
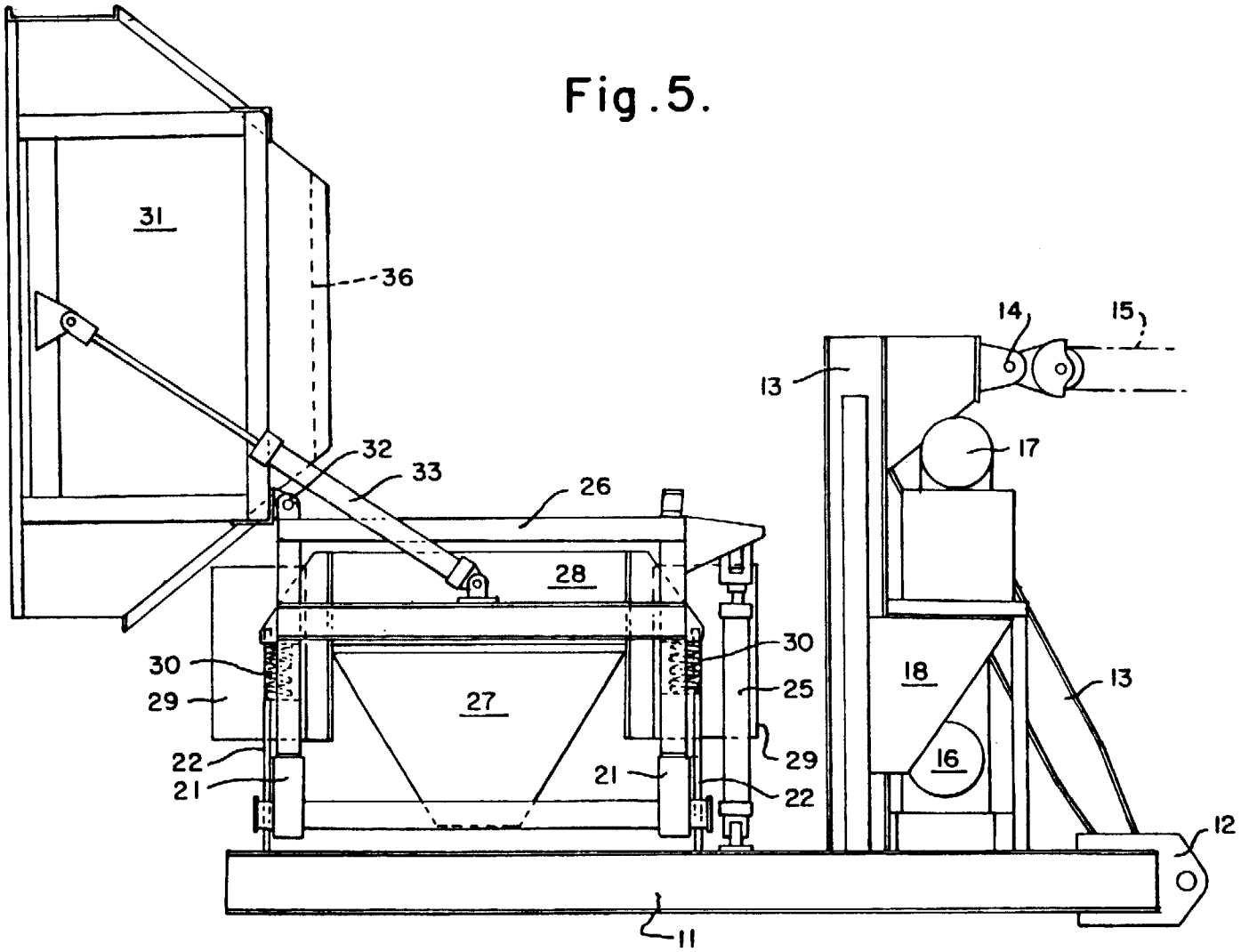
FIG. 5 is an end elevational view of the apparatus showing the hopper titled to discharge large stone and debris.

In operation the support carriage 11 is mounted on tractor 10 using pins in pivot eyes 12 extending through corresponding eyes on the tractor and by cable 15 extending to a take up drum of usual form on such tractors (not shown) through which the angle of the support carriage 11 to tractor 10 may be adjusted to maintain the support carriage generally level with respect to a pipe line ditch 40 being padded. Coarse dirt to be screened for padding is placed in hopper 31 by a back hoe or other soil handling device from the material previously removed from the ditch. This dirt goes to the vibrating feeder and screen 28 which breaks up agglomerates and separates stones and debris from the fine soil suitable for padding. The separated fine soil passes from the vibrating feeder to chute 27 from which it is discharged downwardly onto the pipe being covered or padded. Large stones and debris which are caught on the grizzly bars 36 in the bottom of hopper 31 are periodically dumped to the side of the apparatus by operating cylinders 33 to pivot hopper 31 on pins 3 to the position shown in FIG. 5.

In the foregoing specification we have set out certain preferred practices and embodiments of this invention, however, it will be understood that this invention may be otherwise embodied within the scope of the following claims.

We claim:

1. A padding machine comprising a support carriage, adjustable attachment means at one end of said support carriage for angularly adjustable attachment to a mobile ground carrier, said support carriage extending from the mobile ground carrier, a power source on said carriage adjacent said one end, base means selectively pivoted at [each end ]*opposite ends* thereof on said support carriage whereby said base means is angularly adjustable relative to said support carriage, discharge means on said base means, vibratory feeder and screen means on said base means above the discharge means, hopper means pivoted on said base means above the vibratory feeder means and adapted to deliver dirt to said vibratory feeder and screen means, said dirt containing some undesirable material, said hopper means is provided with means to accumulate said undesirable material, and lift means acting on said hopper means to pivot said hopper means selectively to discharge said accumulated undesirable material to the side of the padding machine.

2. A padding machine as claimed in claim 1 wherein the attachment means includes a three point hitch permitting angular variation between the support carriage and mobile ground carrier.

3. A padding machine as claimed in claim 1 wherein the power source includes a diesel generator and a hydraulic pump.

4. A padding machine as claimed in claim 1 wherein the lift means is a pair of hydraulic cylinders on opposite ends of the hopper means.

5. A padding machine as claimed in claim 1 wherein the hopper means is provided with grizzly bars which serves as said means to accumulate to prevent larger stones and debris from reaching the vibratory feeder and screen means.

6. A padding machine as claimed in claim 1 having hydraulic cylinders acting on the base means to tilt the same to level the base means when the support carriage is tilted.

7. A padding machine as claimed in claim 2 wherein the power source includes a diesel generator and hydraulic pump.

8. A padding machine as claimed in claim 2 or 3 or 7 wherein the lift means is a pair of hydraulic cylinders on opposite ends of the hopper means.

9. A padding machine as claimed in claim 2 or 3 or 7 wherein the hopper means is provided with grizzly bars which serves as said means to accumulate to prevent larger stones and debris from reaching the vibratory feeder and screen means.

10. A padding machine as claimed in claim 8 wherein the hopper means is provided with grizzly bars which serves as said means to accumulate to prevent larger stones and debris from reaching the vibratory feeder and screen means.

11. A padding machine as claimed in claim 2 or 3 or 7 having hydraulic cylinders acting on the base means to tilt the same to level the base means when the support carriage is tilted.

12. A padding machine as claimed in claim 8 having hydraulic cylinders acting on the base means to tilt the same to level the base means when the support carriage is tilted,

13. A padding machine as claimed in claim 9 having hydraulic cylinders acting on the base means to tilt the same to level the base means when the support carriage is tilted.

14. A padding machine as claimed in claim 10 having hydraulic cylinders acting on the base means to tilt the same to level the base means when the support carriage is tilted.

*15. A padding machine comprising a support carriage, adjustable attachment means at one end of said support carriage for angularly adjustable attachment to a mobile ground carrier, said support carriage extending from the mobile ground carrier, a power source on said carriage adjacent said one end, base means pivoted on said support carriage whereby said base means is angularly adjustable relative to said support carriage, discharge means on said base means, vibratory feeder and screen means on said base means above the discharge means, hopper means pivoted on said base means above the vibratory feeder means and adapted to deliver dirt to said vibratory feeder and screen means, said dirt containing some undesirable material, said hopper means provided with means to accumulate said undesirable material, and lift means acting on said hopper means to pivot said hopper means selectively to discharge said accumulated undesirable material to the side of the padding machine.*

*16. A padding machine as claimed in claim 15 wherein the attachment means includes a three point hitch permitting angular variation between the support carriage and mobile ground carrier.*

*17. A padding machine as claimed in claim 15 wherein the power source includes a diesel generator and a hydraulic pump.*

*18. A padding machine as claimed in claim 15 wherein the lift means is a pair of hydraulic cylinders on opposite ends of the hopper means.*

*19. A padding machine as claimed in claim 15 said accumulating means comprising grizzly bars to prevent larger stones and debris from reaching the vibratory feeder.*

*20. A padding machine as claimed in claim 15 having hydraulic cylinders acting on the base frame to tilt the same in one direction or the other on said frame whereby to level the frame when the support carriage is tilted.*

*21. A padding machine comprising:*

*a support carriage,*

*attachment means at one end of said support carriage for angularly adjustable attachment to a mobile ground carrier, said support carriage extending transversely from the mobile ground carrier,*

*a power source on said carriage adjacent said one end,*

*base means selectively pivoted about a transverse axis whereby said base means is angularly adjustable relative to said support carriage,*

*vibratory feeder and screen means carried by said base means for discharging therethrough fine soil for padding,*

*hopper means carried by said base means for delivering dirt to said vibratory feeder and screen means, said dirt containing some undesirable material,*

*means disposed within said hopper means for accumulating said undesirable material, said accumulating means being movable in an arcuate path about a pivot axis,*

*and lift means supported by said base means for moving said accumulating means in said arcuate path selectively to discharge said accumulated undesirable material to the side of the padding machine.*

* * * * *